Oct. 1, 1957    C. V. JOHNSON    2,808,225
COMPRESSED AIR MOTOR
Filed Oct. 6, 1954    2 Sheets-Sheet 1
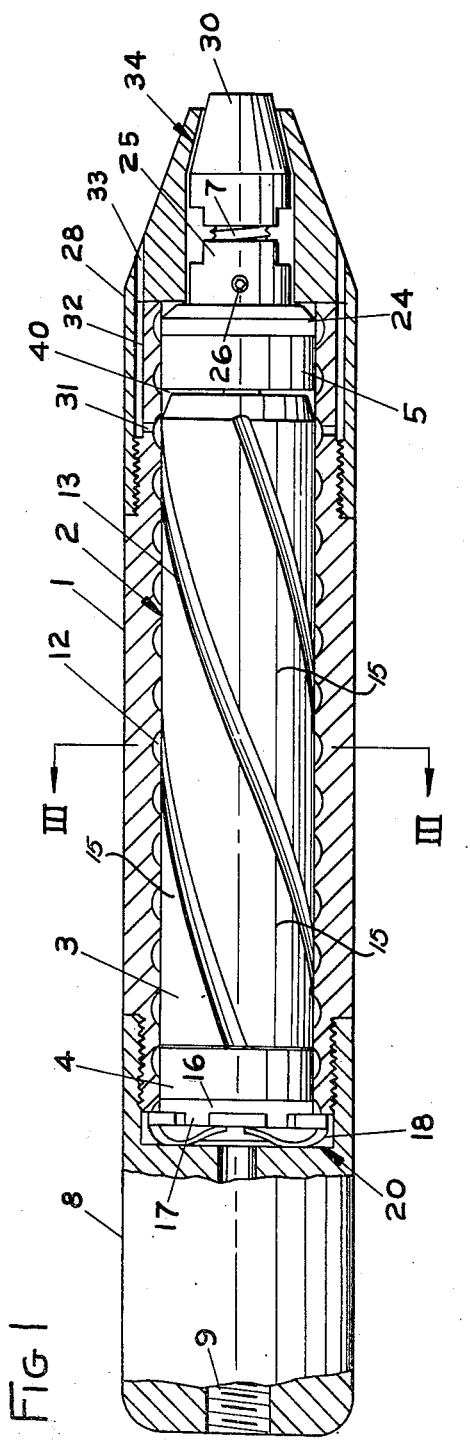
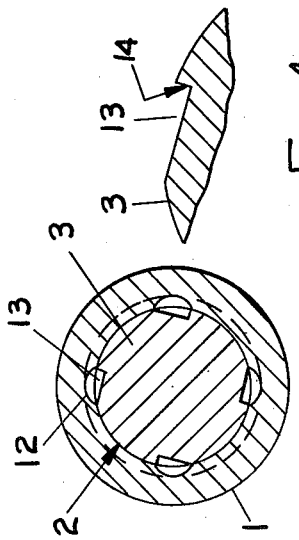
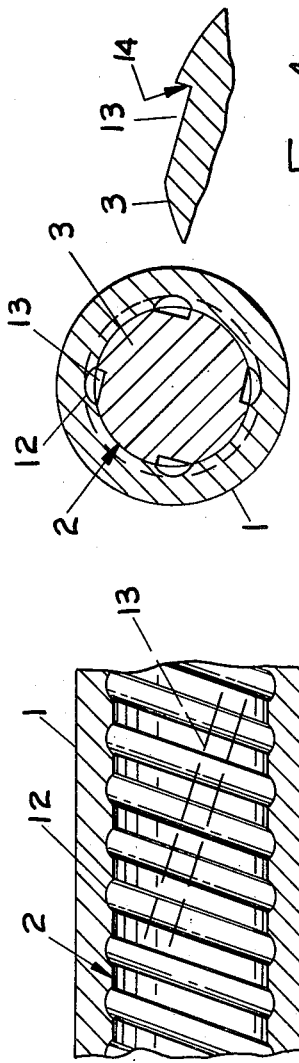
INVENTOR:
    CHARLES V. JOHNSON
BY:
    ATTORNEY Oct. 1, 1957 C. V. JOHNSON 2,808,225
COMPRESSED AIR MOTOR
Filed Oct. 6, 1954 2 Sheets-Sheet 2
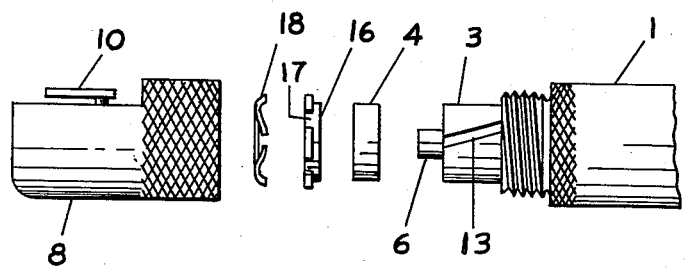
FIG. 5
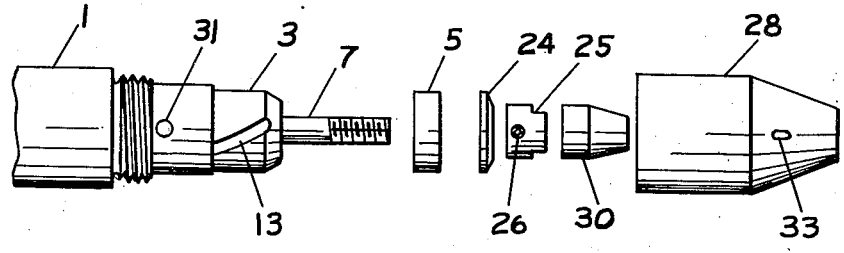
FIG. 6
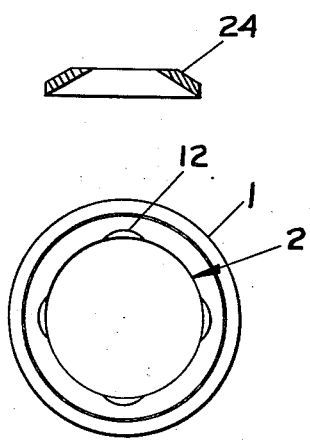
FIG. 7
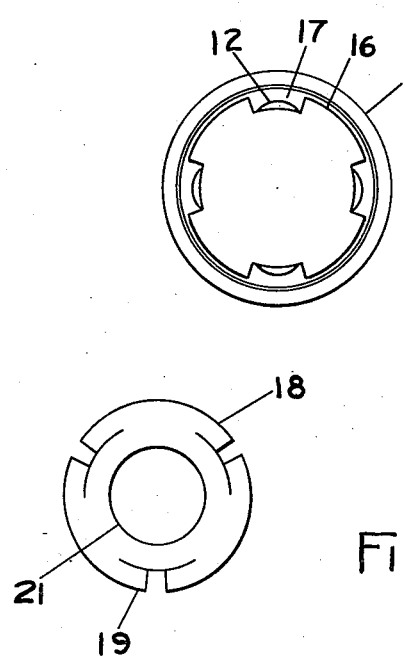
FIG. 8
FIG. 9
FIG. 10
INVENTOR:
    CHARLES V. JOHNSON
BY:
    *Peter P. Price*
    ATTORNEY United States Patent Office 2,808,225
Patented Oct. 1, 1957

2,808,225
COMPRESSED AIR MOTOR

Charles V. Johnson, Grand Rapids, Mich.; Lloyd Karrer, executor of said Charles V. Johnson, deceased, assignor, by mesne assignments, to Nu-Jett Products Corporation, Grand Rapids, Mich., a corporation of Michigan Application October 6, 1954, Serial No. 460,736

4 Claims. (Cl. 253—3)

This invention relates to compressed air motors, or motors operated by compressed air, or other compressed or rapidly moving fluids such as steam under compression. Such fluids when released into the motor impel the rotor thereof at a high speed of rotation.

This application is a continuation in part of my co-pending application entitled Compressed Air Motor, Serial No. 316,668, filed October 24, 1952, now abandoned.

The motor may be made in various sizes. The smaller sizes may be as small as three quarters of an inch in outside diameter, and have been found most useful for propelling small grinding stones or abrasive points which are mounted in the shaft of the motor and rotate at high speed and with considerable power. When so used, the body of the motor, being not much larger than a sizable pencil, serves as a handle by which the grinding point may be dexterously manipulated at many angles to perform fine and delicate work such as in the art of engraving or of tool and die making.

This invention is designed to provide an ultra high speed motor having speeds in excess of 100,000 revolutions per minute. At such speeds many functional difficulties are created and others, normally inconsequential in motors having a more conventional speed range, becomes serious. This invention provides a solution for these problems including stabilization of the rotor, protection of the bearings to give them a reasonable life expectancy, and protection of the operator against failure of the tool chuck assembly.

Accordingly, the invention embodies various new and useful features of construction and arrangement, as hereinafter more fully described and particularly pointed out in the claims.

Reference is had to the accompanying drawings which show a typical form of construction of the motor.

Fig. 1 is a central sectional view of the motor.

Fig. 2 is a fragmentary central sectional view of the housing showing the air channel grooving therein.

Fig. 3 is a sectional elevation view taken along the plane III—III of Fig. 1.

Fig. 4 is an enlarged fragmentry sectional view of the rotor.

Fig. 5 is a fragmentary exploded view of the rear portion of the motor.

Fig. 6 is a fragmentary exploded view of the forward portion of the motor.

Fig. 7 is a sectional view of the front retainer.

Fig. 8 is a rear elevation view of the motor showing the back retainer.

Fig. 9 is a rear elevation view of the motor identical to Fig. 8 except the back retainer has been removed.

Fig. 10 is a rear elevation view of the spring for the back retainer.

In the following description the terms "front" and "rear" are frequently used and are to be taken to mean "front" toward the chuck end of the motor and "rear" toward the air intake port.

The stator or shell 1 may be of cylindrical outer shape having a central longitudinal cylindrical bore 2 open at both ends which ends are closed in the assembly as hereafter described. Within the bore 2 is a cylindrical rotor 3 which is rotatably mounted on ball or roller bearings 4 and 5. The bearings are located around the stub shaft 6 and the drive shaft 7 of the rotor, and inserted into the respective ends of the bore 2. While the shafts 6 and 7 are described as two separate, short components it will be recognized that they may be the opposite ends of a single shaft extending through the body of the rotor or they may be integral with the rotor body. The rotor fits very closely within the bore, the clearance in the smaller sizes being on the order of .001".

The inlet end of the shell 1 is closed by a screw-threaded cap 8, provided with a threaded opening 9 to receive a fitting for a hose or other conduit by which the compressed air or other power medium is introduced into the motor. A valve unit is provided in the cap 8 to control the flow of the medium to the motor. The valve is operated by an external lever 10 (Fig. 5). Further description of the valve is not believed necessary since it forms no part of this invention.

The walls of the bore 2 of the shell 1 are provided with at least one helical groove 12 extending a substatial portion of the length of the housing. In the illustration, the helical grooves 12 are four in number and extend the entire length of the housing (Fig. 2). The helical grooves 12 serve as air channels by means of which the air may travel through the tool from the valved intake end of the discharge end adjacent the tool chuck. The turns of the grooves, as shown, are closely spaced.

The grooves 12 cooperate with helical grooves 13 cut in the face of the rotor 3 (Fig. 1). The grooves 13 have one face inclined to the surface of the rotor and another face substantially normal to the surface of the rotor to form a shoulder 14 (Fig. 4). The shoulder 14 forms a baffle against which the air passing through the motor operates to drive the rotor. Thus, this shoulder is on the side of the groove in the direction of rotation of the rotor. The grooves are separated by the lands 15 which, as illustrated, are substantially wider than the grooves 13. This construction provides a greater total land surface area than is occupied by the grooves.

The grooves 12 and 13 are so related to each other that they intersect at a right angle (Fig. 2). This right angle intersection causes the air to impinge directly against the shoulder 14, thus imparting both speed and torque to the rotor. The significance of this arrangement will be discussed more fully under "Operation."

At the rear end of the motor, the bearing 4 supporting the rear end of the rotor 3 is lightly press-fitted into the end of the shell 1. It is so located as to leave a short space between its rearward end and the end of the shell 1. Seated over the end of the shell 1 is retainer cap 16 (Figs. 1, 5 and 8). The retainer cap has a portion of reduced diameter designed to enter the bore 2 and seat against the rear surface of the bearing 4. The rearward portion of the retainer cap includes a flange designed to extend out over the end of the shell 1 but capable of being received into the open end of the cap 8. This flange has peripheral notches 17 equal in number to the number of grooves 12 in the wall of the bore 2. Where, as in this case, four grooves are used, there will be four notches. These notches are aligned with the grooves 2 and provide the openings by which air enters the grooves in the shell 1. Rearwardly of the retainer 16 is a spring 18 (Fig. 10) having spaced, resilient legs 19. The spring bears against the retainer cap 16 and a shoulder 20 in the cap 8. The center of the spring 18 is apertured at 21 to permit passage of air from the cap 8 to the interior of the motor.

At the forward end of the motor, the bearing 5 is press-fitted into the end of the housing 1. Like the rear bearing 4, the bearing 5 is inserted into the bore 2 to permit the installation of a front retainer 24 (Fig. 1) within the bore 2. The front retainer 24 bears against the forward end of the bearing 5. The front retainer 24 has the shape of a washer but its sides are slightly coned as indicated in Fig. 7. The internal opening of the front retainer 24 is enlarged to permit installation of the wrench nut 25. The wrench nut is secured directly to the shaft 7 by means of a pair of diametrically positioned set screws 26 (Figs. 1 and 6). The wrench nut 25 has a pair of diametrically spaced notches. These serve as a seat for the wrench used to hold the drive shaft 7.

The forward end of the front stub shaft 7 is threaded to receive the tool chuck 30. That portion of the stub shaft 7 within the tool receiving chamber of the chuck 30 is bored and split to permit it to be clamped about a tool. The tool chuck 30 is entirely enclosed within the forward end of the front cap 28. The tool chuck has a wrench seat in the form of two diametrically positioned notches at its rearward end. The purpose of this arrangement will be explained more fully under "Operation."

Air being discharged from the bore 2 exits through four holes 31 adjacent the forward end of the housing 1. At this point the interior walls of the front cap 28 are spaced from the exterior walls of the housing 1 to create an annular air passage 32. This air passage 32 communicates with four discharge openings 33 extending axially through the front end of the front cap 28. Since there is a clearance opening between the interior of the front cap 28 and the wrench nut 25, some air flows between these two and exits through the central bore 34 of the front cap, passing around the tool chuck 30. This air serves as a means for clearing the chips from the immediate vicinity of the tool. This passageway, however, is restricted, since the clearance between the wrench retainer 25 and the interior walls of the front cap 28 and between the tool chuck 30 and the walls of the central bore 34 is kept at a minimum. The purpose of this arrangement will be explained more fully under "Operation."

The front cap 28 is internally threaded at its rearward end to engage the shell 1. The removal of the front cap 28 does not release any components of the motor since the cap 28 serves only as an outer cover. This is essential since the cap 28 must be removed each time a tool is inserted or removed from the chuck 30.

*Operation*

It is most important in the assembly of this motor that the parts fit closely yet that there be no binding even of the slightest degree. This is particularly essential because of the high operating angular velocity of the rotor 3. If there is even slight binding, misalignment or imperfections in either the rotor or the mounting bearings, failure may occur almost immediately due to the high operating speeds.

The motor is assembled by inserting the rotor 3 in the bore 2. The bearings 4 and 5 are then press-fitted into place. The press-fit must be light to avoid all possibility of warpage, compression or other deformation of the bearing races. With the rotor and bearings in place, the rear retainer cap 16 is then seated. In seating this cap, care is taken to align the notches 17 with the grooves 12 in the wall of the bore 2. This is essential to assure an adequate flow of air into the bore 2 to operate the rotor 3. The retainer spring 18 is seated and the rear cap 8 screwed into place. Prior to assembly of the retainer cap 8 to the shell 1, the valve assembly is placed within the retainer cap ready for operation. The retainer spring 18 permits the rear retainer cap to be secured by adequate pressure even though some variation may occur in the depth of the front opening of the rear cap 8.

At the front end, the front retainer 24 is located and the wrenching nut 25 is secured by means of the set screws 26. The wrenching nut serves as a means of gripping the shaft when tools are changed. The chuck is then threaded onto the end of the drive shaft 7. With this assembly complete, the front cap 28 is placed over the entire assembly, encasing the front assembly, including the chuck. The chuck 30 may be either entirely confined within the front cap 28 or a short portion of its front end may project from the cap.

The use of a front cap enclosing the chuck is an important safety measure. The high speed of this motor makes it essential that the motor not be used with oversized tools. Such tools are likely to fail under the centrifical forces generated by the motor's high angular velocity. At such high operating speeds, segments of a burr or a grinder released by failure of the tool become dangerous missiles. Such a chip can embed itself deep in a person's body and do serious damage because its velocity begins to approach that of a bullet, particularly at close range.

By so designing the front cap that it encloses the chuck, it is necessary to remove the front cap in order to mount the tool. Thus, the front cap must be placed over the tool after it has been secured to the chuck. The length of the cap is such that the tool can not be secured in the chuck without complete removal of the front cap. Consequently, the restricted opening at the forward end of the front cap limits the diameter of the tools which may be used with this motor.

The design of the front cap has another important safety feature. At these high operating speeds, the chuck 30 or the drive shaft 7 may fail. Failure of these components is even more dangerous than that of the tool because of their larger diameter and mass. By encasing the chuck and the drive shaft within the front cap 28, the danger of physical injury to the operator as a result of such failures is eliminated since the front cap serves as a safety shield preventing these parts from flying out at a high velocity. These are safety precautions not normally necessary with conventional motors but essential with a high speed motor of this type.

In the operation of this motor, it has been found that the rotor 3 floats on an air film within the bore 2. It is believed this air film exists between the rotor 3 and the surface of the bore 2 in the areas where these surfaces are proximate to each other in the areas between the grooves 12 and the grooves 13. This air film balances the rotor within the bore 2 and prevents the rotor from moving radially out of alignment with the bore 2.

Because of the small clearance, normally not in excess of .001 of an inch, between the surface of the rotor and the surface of the bore, the air film existing between these two parts is very thin. When gases are spread in extremely thin films, the normal elastic qualities of the gases apparently disappear and the gaseous film exhibits more of the characteristics of a viscous, relatively incompressible liquid. It is believed the rotor's high angular velocity contributes to this effect. Such an air film will sustain high compressive loadings. Because of the relatively inelastic characteristics of the thin gas film, the rotor 3 is firmly supported on all sides during its operation.

This support is important because it centers the rotor in the bearings 4 and 5 and relieves these bearings of much of the side thrust that would otherwise occur. Any appreciable degree of side thrust at operating speeds as high as are experienced in this motor, will cause rapid bearing failure. Tests have shown, with this particular motor, that the bearings will have a life expectancy many times that possible with such bearings were they subjected to the side thrust loads which would be experienced in the absence of this air film.

It is believed that some centering effect results from the escape of the air from the grooves 12 into the grooves 13 since the even spacing of these grooves assures the application of these forces in such a manner as to bring the forces into balance along the axial centerline of the rotor. This, again, contributes to the bearing life of the motor by relieving the radial bearings 4 and 5 of a substantial portion of the side thrust they would normally have to sustain.

It is believed that centripedal forces generated by the high angular velocity of the rotor also tend to center the rotor. When the angular velocity of an object passes the point where the frequency of the vibration set up by its eccentricities equals the natural frequency of the object, deflection of the object will cease and thereafter the object will have a tendency to center about its axial centerline. Due to the construction of the grooves 12 and 13 and their right angle intersection, the rotor 3 passes very rapidly through the critical velocity zone approaching this situation. This rapid velocity build up prevents failures which would otherwise occur. When the rotor 3 has attained its operating speed, the centripedal forces it generates contribute materially to the tendency of the rotor to be self centering, thus, relieving the bearings of radial thrust.

The motor is so designed that more air may enter the bore 2 through the notches 17 than may be discharged from the bore through the openings 31 or by leakage about or through the front retainer 24. The result is a restriction of the air flow through the motor resulting in a back pressure within the motor. The placement of the front retainer 24 between the front bearing 5 and the internal bore 34 of the front cap 28 results in this back pressure operating in the slight space 40 existing between the front end of the rotor 3 and the bearing 5. This back pressure does not operate against the balls of the radial bearing 5 since these are entirely surrounded by the air and, thus, have equal forces applied to all faces. The back pressure operates against the restricting front retainer 24. The result of this arrangement is the existence of forces operating both on the front and the back of the rotor tending to center it longitudinally of the bore 2.

This centering action relieves both the front and the back radial bearings 4 and 5 of thrust loads. The rotor 3 is not only centered radially within the bore 2 but is centered axially. It has been found that the air pressures entering the motor together with the back pressure created by the restriction at the forward end of the bore 2 is sufficient to keep the rotor centered axially of the bore even though both axial and radial eccentric loadings are created by the operator's pressing the tool against the working surface. It has been found that normal operating pressures used to cause the tools to cut the working surfaces will not cause appreciable displacement of the rotor and transmission of these loads to the radial bearings 4 and 5.

The right angle intersection of the grooves 12 and 13 contributes materially to the speed and torque generated by this motor. This right angle intersection, which occurs at all points along the length of the rotor 3, assures maximum discharge of energy from the air stream to the rotor. Further, it greatly reduces the turbulence which is experienced when the point of intersection deviates materially from a 90° relationship at any point along the length of the rotor. This absence of turbulence is believed to contribute substantially toward the proper formation of the air film employed to maintain the rotor radially centered about its longitudinal axis. It also means that the stream of air moving down the grooves 12 will impinge directly and squarely upon the shoulder 14 of the grooves 13. Thus the forces will be acting directly rather than on a slant. The resulting high torque generated by this motor makes it an efficient tool driver.

The construction of the motor permits it to operate satisfactorily on a relatively small amount of compressed air. This means economy in its operation. The manner in which the air is discharged from the motor assures the operator of a clear view of his work since the air escaping around the chuck 30 clears the chips from the immediate vicinity of the tool while the air escaping from the nozzles 33 pushes these chips still further away from the actual operating point at which the tool is being operated. The rapid removal of these chips not only improves the operator's visibility but prevents damage to delicate work by reason of the chips.

It will be recognized that various modifications of this invention may be made. Each of these modifications is to be considered as included in the hereinafter appended claims unless these claims by their language expressly state otherwise.

I claim:

1. A fluid operated power motor comprising: a stator shell having a cylindrical bore with helical groove means in its interior surface; a cylindrical rotor having helical groove means with lands between each groove; means for rotatably supporting said rotor within said stator shell with the rotor groove means intersecting the stator groove means; means for admitting fluid under pressure to one end of said groove means in said shell; means at the opposite end of said shell for discharging said fluid; said helical groove means in said shell including a plurality of closely spaced turns and said lands being wider than said rotor groove means to provide a total land surface area greater than the area occupied by said rotor groove means.

2. A fluid operated power motor comprising: a stator shell having a cylindrical bore with helical groove means in its interior surface; a cylindrical rotor having helical groove means with lands between each groove; means for rotatably supporting said rotor within the stator with the rotor groove means intersecting the stator groove means throughout substantially the length of said rotor; means for admitting fluid under pressure to one end of said groove means in said shell; means at the opposite end of said shell for discharging said fluid; the land surfaces of said rotor being closely adjacent the interior surface of said stator shell and forming a thin annular gap therebetween; the thickness of said gap being such that when air passes through said stator groove means a film of air forms an elastic cushion separating said surfaces; said helical groove means in said shell including a plurality of closely spaced turns and said lands being wider than said rotor groove means to provide a total land surface area greater than the area occupied by said rotor groove means.

3. The power motor of claim 2 in which the rotor groove means comprises a plurality of grooves relatively few in number and extending generally lengthwise of the axis to provide the wide lands between the rotor grooves.

4. A fluid operated power motor comprising: a stator shell having a cylindrical bore with helical groove means in its interior surface; a cylindrical rotor having helical groove means with lands between each groove; means for rotatably supporting said rotor within the stator with the rotor groove means intersecting the stator groove means at approximately right angles throughout substantially the length of said rotor; means for admitting fluid under pressure to one end of said groove means in said shell; means at the opposite end of said shell for discharging said fluid; the land surfaces of said rotor being closely adjacent the interior surface of said stator shell and forming a thin annular gap therebetween; the thickness of said gap being such that when air passes through said stator groove means a film of air forms an elastic cushion separating said surfaces; said helical groove means in said shell including a plurality of closely spaced turns and said lands being wider than said rotor groove means to provide a total land surface area greater than the area occupied by said rotor groove means.

References Cited in the file of this patent

UNITED STATES PATENTS

| | | |
|---|---|---|
| 778,928 | Webb | Jan. 3, 1905 |
| 797,706 | Patschke | Aug. 22, 1905 |
| 981,311 | Rivers | Jan. 10, 1911 |
| 1,878,747 | Youngblood | Sept. 20, 1932 |
| 2,358,420 | Schwier | Sept. 19, 1944 |
| 2,492,966 | Ckola | Jan. 3, 1950 |
| 2,592,519 | Postlewaite | Apr. 8, 1952 |
| 2,608,807 | Nilsen et al. | Sept. 2, 1952 |
| 2,648,939 | Zelik et al. | Aug. 18, 1953 |